(12) United States Patent
Lanka et al.

(10) Patent No.: US 12,229,126 B2
(45) Date of Patent: Feb. 18, 2025

(54) RUN TIME MEMORY MANAGEMENT FOR COMPUTING SYSTEMS, INCLUDING MASSIVELY PARALLEL DATABASE PROCESSING SYSTEMS

(71) Applicant: Teradata US, Inc., San Diego, CA (US)

(72) Inventors: Kapil Kedar Lanka, Hyderabad (IN); Nobul Reddy Goli, Hyderabad (IN); B. Anantha Subramanian, Bangalore (IN); Veerendra Kumar Achanta, Hyderabad (IN)

(73) Assignee: Teradata US, Inc., San Diego, CA (US)

( * ) Notice: Subject to any disclaimer, the term of this patent is extended or adjusted under 35 U.S.C. 154(b) by 166 days.

(21) Appl. No.: 17/563,757

(22) Filed: Dec. 28, 2021

(65) Prior Publication Data

US 2022/0215024 A1    Jul. 7, 2022

Related U.S. Application Data

(60) Provisional application No. 63/132,589, filed on Dec. 31, 2020.

(51) Int. Cl.
*G06F 16/2453* (2019.01)
*G06F 16/2455* (2019.01)

(52) U.S. Cl.
CPC .. *G06F 16/24532* (2019.01); *G06F 16/24552* (2019.01); *G06F 16/24568* (2019.01)

(58) Field of Classification Search
CPC ......... G06F 16/24532; G06F 16/24568; G06F 16/24552

USPC ......................................................... 707/764
See application file for complete search history.

(56) References Cited

U.S. PATENT DOCUMENTS

2018/0218039 A1* 8/2018 Steinbeck ......... G06F 16/24542
2021/0397549 A1* 12/2021 Pressler ................ G06F 9/4843

OTHER PUBLICATIONS

Molnar, Peter et al. "Stack Allocation of Objects in the Cacao Virtual Machine". PPPJ '09: Proceedings of the 7th International Conference on Principles and Practice of Programming in Java. Published Aug. 27, 2009. Accessed Aug. 26, 2023 from <https://doi.org/10.1145/1596655.1596680> (Year: 2009).*

* cited by examiner

*Primary Examiner* — Robert W Beausoliel, Jr.
*Assistant Examiner* — Lauren Zannah Ganger
(74) *Attorney, Agent, or Firm* — Ramin Mahboubian

(57) ABSTRACT

Improved techniques for management of memory (or memory management) for computing systems and environments are disclosed. The improved techniques are especially well suited for computing systems that operate in highly complex and/or demanding computing environments (e.g., massively parallel database systems that may be required to process many complex database queries in parallel. Memory can be managed dynamically at run time to determine and designate one of multiple memories that are available for execution of executable components (e.g., database queries, Opcodes of a Virtual Machine). In addition, memory can be managed dynamically at run time to effectively reuse memory locations of a memory (e.g., stack memory) being used for execution of one or more executable components (e.g., Opcodes of a Virtual Machine) at run time when the memory is being actively used to execute the one or more executable components.

22 Claims, 7 Drawing Sheets

RUN TIME MEMORY MANAGEMENT FOR COMPUTING SYSTEMS, INCLUDING MASSIVELY PARALLEL DATABASE PROCESSING SYSTEMS

CROSS-REFERENCE TO REALTED PATENT APPLICATIONS

This Patent Application takes priority from the U.S. Provisional Patent Application No. 63/132,589, entitled: "Dynamic Switching B/W stack to Heap Memory Management," filed on Dec. 31, 2020.

BACKGROUND

In the context of computing environments and systems, data can encompass virtually all forms of information. Data can be stored in a computer readable medium (e.g., memory, hard disk). Data, and in particular, one or more instances of data can also be referred to as data object(s). As it is generally known in the art, a data object can for example, be an actual instance of data, a class, type, or form data, and so on.

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in San Diego).

Generally, database systems are much more complex than the example noted above. In addition, databases have been evolved over the years and some databases that are for various business and organizations (e.g., banks, retail stores, governmental agencies, universities) in use today can be very complex and support several users simultaneously by providing very complex queries (e.g., give me the name of all customers under the age of thirty five (35) in Ohio that have bought all items in a list of items in the past month in Ohio and also have bought ticket for a baseball game in San Diego and purchased a baseball in the past 10 years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database is the Relational Database Management System (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One important aspect of database systems is various database operations that they support and optimization of the database queries of the data stored in the database, as it is generally appreciated by those skilled in the art. One such database operation is generally known as a database Join operation (or "Join" as also may be referred to herein). For example, in a SQL environment, a SQL Join statement can be used to combine data or rows from two or more tables based on a common field between them. Different types of Joins include, INNER JOIN, LEFT JOIN, RIGHT JOIN and FULL JOIN. Simply put a Join operation can be used to effectively combine the information provided in database (e.g., as database tables) to address database quarriers. For example, in a database where a first database table provides information about students and their age, a second database table that provides information about the students and their favorite subjects and a third database that provides information about the students and their respective Grade Point Averages (GPA's), join operations can be suggestively applied to the tables to effectively join their information to address various database queries, including, for example, finding all the students that are age 19 with a GPA of 3.5 or higher that have "math" as their favorite subject, and so on.

A more recent development in database systems is the use of multi-processing computing or parallel computing system, especially Massively Parallel Processing (MPP) database systems that use a relatively large number of processing units to process data in parallel.

Another more recent development is the development of modern analytics (or data analytics) methods including, for example, statistical analytics, machine learning methods, discrete mathematics (e.g., graph analytics, deep learning). These modern analytics can be quite complex. As such, MPP database systems, among other things, are relatively much better suited for running (or executing modern analytics (or data analytics) methods.

Partly as a result of these more recent developments, there is an ever-increasing need for Relational Database to process increasingly more and more data for various applications in many existing computing environments and systems. For example, today, in a number of existing database environments, there is a need to execute (or run) thousands of database queries in parallel, or virtually simultaneously.

In view of the ever-increasing need to process more and more data for various applications in many different computing environments and systems, improved techniques for execution of executable code in computing systems, especially in Massively Parallel Processing (MPP) database systems, would be very useful.

SUMMARY

Broadly speaking, the invention relates to computing environments and systems. More particularly, the invention relates to improved techniques for management of memory (or memory management) for computing systems and environments. The improved techniques are especially well suited for computing systems that operate in highly complex and/or demanding computing environments (e.g., massively parallel database systems that may be required to process many complex database queries in parallel.

In accordance with one aspect of the improved techniques, memory can be managed dynamically, at run time, to determine and designate one of multiple memories (e.g., stack memory, heap memory) that are available for execution of executable components (e.g., database queries, Opcodes of a Virtual Machine) in accordance with one aspect. The determination can be made at run time based on one or more factors, including factors that may vary from time to time (e.g., number of processors pending, availability of system resources including free memory). As such, the designated memory can be more suitable at the time when it is designated (run time) than a predesignated (or default) memory for execution of the executable components, given that the factors that are determinize of actual performance and/or feasibility can best be evaluated at run time in light of current or active conditions of the computing system or environment.

In accordance with another aspect, memory can be managed dynamically, at run time, to effectively reuse memory location(s) of a memory (e.g., stack memory) as it is being used for execution of one or more executable components (e.g., Opcodes of a Virtual Machine). In doing so, at run time, use of memory can be monitored when the memory is being actively used to execute the one or more executable components, in order to determine at run time to safely reuse the memory location(s) of the memory.

Still other aspects, embodiment and advantages will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
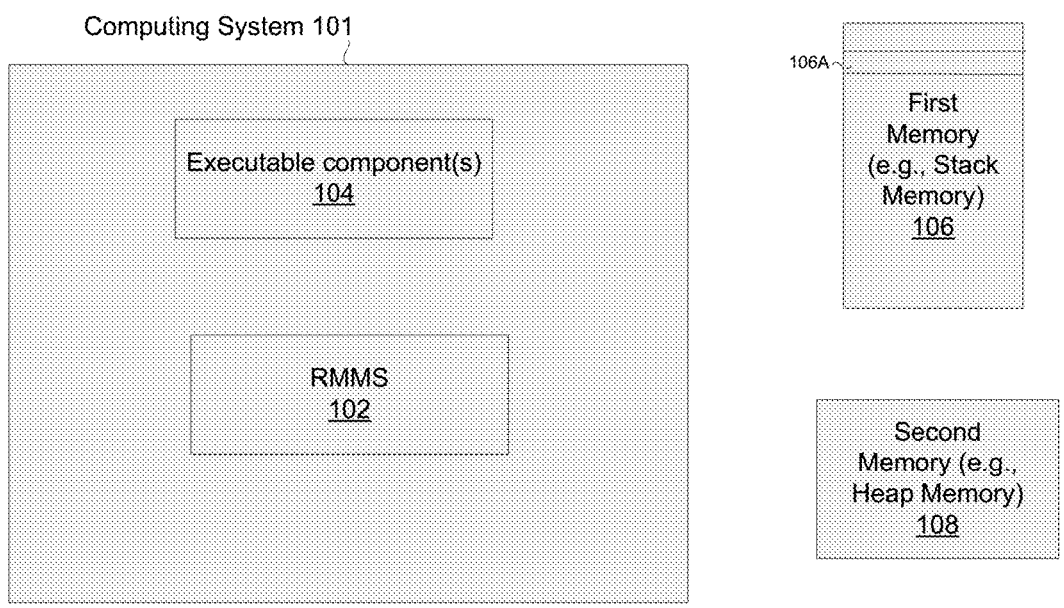
FIG. 1 depicts a Runtime Memory Management System (RMMS) in a computing system in a computing environment in accordance with one embodiment.

As noted in the background section, in view of the ever-increasing need to process more and more data for various applications in many different computing environments and systems, improved techniques for execution of executable code would be highly useful. To that end, improved memory management techniques for managing memory used for the execution executable code are needed with the realization that memory can play a critical role in execution of the executable code, especially in highly complex modern computing system with an ever-increasing need to process increasing more data at more demanding expected service times. As such, improved techniques for management of memory (or memory management) are needed in computer environments and systems, especially in Massively Parallel Processing (MPP) database systems that process increasingly more database queries with increasingly more complexity in demanding applications (e.g., data analytics).

By way of example, typically, execution of a SQL database query, by (or in) a database system requires a quantum of memory, for processing the input rows of database tables of a database, in addition to resolving the database query expressions and/or aggregation of data. Consequently, for database queries involving large analytic functions or regular expressions, a relatively huge amount of memory can be utilized or consumed. Conventionally, memory needed for execution of executable code is either pre-allocated (or predesignated to be allocated) from a program to a stack memory or heap memory. In an environment where thousands of database queries are running parallelly, the overall amount of memory needed can effectively grow exponentially. As a result, in high workload running environments, memory can become a critical resource. In such situations, it would be more feasible, if not critical, to allocate memory for execution from a stack memory to heap memory at run time in accordance with one or more aspects of the improved techniques as will be described below.

Furthermore, every call to a memory Application Programming Interface (API) for example to allocate memory on a relatively more abundant memory space (e.g., heap memory) can incur an additional overhead. As a result, the database query execution times can become significantly, if not dramatically, prolonged if many API calls are made. However, some of the API calls may not be necessary and/or the total number of API can be reduced, in accordance with one or more aspects of the improved techniques as will be described below.

In accordance with one aspect of the improved techniques, memory can be managed dynamically, at run time, to determine and designate one of multiple memories (e.g., stack memory, heap memory) that are available for execution of executable components (e.g., database queries, Opcodes of a Virtual Machine) in accordance with one aspect. The determination can be made at run time based on one or more factors, including factors that may vary from time to time (e.g., number of processors pending, availability of system resources including free memory). As such, the designated memory can be more suitable at the time when it is designated (run time) than a predesignated (or default) memory for execution of the executable components, given that the factors that are determinize of actual performance and/or feasibility can best be evaluated at run time in light of current or active conditions of the computing system or environment.

In accordance with another aspect, memory can be managed dynamically, at run time, to effectively reuse memory location(s) of a memory (e.g., stack memory) as it is being used for execution of one or more executable components (e.g., Opcodes of a Virtual Machine). In doing so, at run time, use of memory can be monitored when the memory is being actively used to execute the one or more executable components, in order to determine at run time to safely reuse the memory location(s) of the memory.

It should be noted that these and other aspects can be combined and used together.

Embodiments of some aspects of the improved techniques are also discussed below with reference to FIGS. 1-6. However, those skilled in the art will readily appreciate that the detailed description given herein with respect to these figures is for explanatory purposes as the invention extends beyond these limited embodiments.

FIG. 1 depicts a Runtime Memory Management System (RMMS) 102 in a computing system 101 in a computing environment 100 in accordance with one embodiment. Referring to FIG. 1, the Memory Management System (RMMS) 102 is shown conceptually in connection with one or more executable components (e.g., one or more database queries, Opcodes of a Virtual Machine) 104. Those skilled in the art will readily appreciate that the computing system 101 can, for example, be a computer that includes one or more physical processors (not shown) configured to access memory (e.g., first memory 106, second memory 108) to execute the one or more executable components (e.g., one or more database queries) 104 at run time (or runtime, or execution time). As such, the computing system 101 can initiate or effectively initiate the execution of one or more executable components 104 at run time (or at the time when the one or more executable components 104 are to be executed by the computing system 101). As a result of, or in connection with, the initiation of the execution of one or more executable components 104, a first memory (e.g., a stack memory) 106 and a second memory (e.g., heap memory) 108 can be effectively utilized for the execution one or more executable components 104. It should be noted that, conventionally, memory would be allocated, for example, in a stack memory 106 or in a heap memory 108, based on a predetermination made before runtime. As such, conventionally, at runtime, either the stack memory or heap memory are typically predesignated and therefore utilized at runtime to execute the one or more executable components 104, especially for execution of database queries in conventional database systems.

By way of example, when one or more executable components 104 are (or include) one or more database queries, conventionally, a stack memory 106 is utilized at runtime to execute the one or more database queries. As noted above the conventional approaches of executable code can have problems, including stack over flow errors due to execution of the memory on a stack memory (e.g., stack memory 106), as well as overheads associated with API calls needed to allocate memory on the heap memory (e.g., heap memory 108).

As such, it will be appreciated that the Runtime Memory Management System (RMMS) 102 can dynamically manage memory usage of the one or more executable components 104, in a manner that an optimal memory strategy can be determined and consequently used at runtime. The dynamic memory management can make this determination, at run time, based on one or more factors as determined at runtime (e.g., current storage available on the memory stack 106, number of executable components that may be pending).

It should be noted that it is still possible to predesignate a memory, for example, the first memory 106 provided, for example, as a stack memory, can serve as a default (or predesignated) memory for execution of the one or more components 104. However, the Runtime Memory Management System (RMMS) 102 can dynamically, at run time, switch the default designation, for example, from the first memory 106 provided as a stack memory, to the second memory 108 provided, as a heap memory. The switch can be made based on one or more assessment made at run time, when it is deemed to be more beneficial to switch from a predesignated (or default) memory to one that is deemed more feasible and/or suitable for execution of the one or more executable components 104.

To further elaborate, the execution of one or more executable components 104 can be initiated at run time when the executable components are to be executed by the computing system 101. The Runtime Memory Management System (RMMS) 102 can determine, at run time, when the one or more executable components are being executed by the computing system, whether to designate a first memory 106 or designate a second memory 108 to execute the one or more executable components. It should be noted that first memory 106 and second memory can be different types of memory 108 with respect to advantages and disadvantages that they can provide in comparison with each other. Accordingly, the first memory 106 can be designated, at run time, to execute the one or more executable components 104 when it is determined to use only to designate the first memory 106 to execute the one or more executable components. On the other hand, the second memory 108 can be designated, at run time, to execute the one or more executable components 104 when it is determined to designate the second memory 108 to execute the one or more executable components 104.

It should also be noted that the Runtime Memory Management System (RMMS) 102 can also be configured to determine, at run time, whether to designate both the first memory 106 and second memory 108 to execute the one or more executable components 104. Accordingly, the first memory 106 and second memory 108 can both be designated, at runtime, to execute the one or more executable components 104. In addition, the Runtime Memory Management System (RMMS) 102 can also be configured to switch, at run time, the designation of the first memory 106 to the second memory 108 (or vice versa) for the execution of the one or more executable components.

By way of example, the Runtime Memory Management System (RMMS) 102 can determine, at runtime, whether to use the heap memory 108 instead of, or in addition, to using the stack memory 106. In other words, Runtime Memory Management System (RMMS) 102 can determine, at (or during) run time, when the one or more executable components are or are being executed by the computing system, whether to use the heap memory 108 to execute the one or more executable components104 instead of and/or in addition to (and/or connection with) using the stack memory 106 in order to execute and/or continue to execute the one or more executable components 104. The determination can, for example, be based on an estimated of size of memory needed in the stack memory 106 to execute the one or more executable components 102, current space available on the heap memory, size of the heap memory 108, number of active processes, number of active processes and/or processors that are likely to require memory, a predetermined estimated memory size of the heap memory, an so on.

As result of the determination by the Runtime Memory Management System (RMMS) 102, at runtime, the one or more executable components 104 can be executed by using (or in) the heap memory 108, instead of using the stack memory 106, or in addition to using the stack memory 106.

In addition, the Runtime Memory Management System (RMMS) 102 can, at runtime, dynamically switch memory usage, from the stack memory 106 to the heap memory 108 to process the one or more processors in and/or by the computing system.

Furthermore, In accordance with another embodiment, the Runtime Memory Management System (RMMS) 102 can be also be configured to dynamically reuse memory used for the execution one or more executable components 104 (e.g., first memory 106, second memory 108) at run time when the one or more executable components 104 are being executed. By way of example, the Runtime Memory Management System (RMMS) 102, at run time, can reuse one or more memory locations (portions or segments or blocks or chucks) 106A of the first memory 106, instead of merely allocating a new memory location each time memory is needed for execution of the one or more executable components 106. For example, the Runtime Memory Management System (RMMS) 102 can reuse a stack memory location 106A for execution of multiple Opcodes associated with a Virtual Machine (VM) (not shown) operating in the computing system 101, instead of allocating another memory location on the stack memory 106. In the example, the stack memory location 106A can be used for a first one the Opcodes (provided as executable components 104). The stack memory location 106A can be reused (used again) by a second one of the Opcodes, instead of having to allocate yet another memory location on the stack memory 106 for the execution of the second one of the Opcodes when it determined, at runtime, the stack memory stack location 106A can be reused (i.e., when it is safe and possible to reuse the stack location 106A) as it will described in greater detail bellow.

To further elaborate, run time memory management techniques will be further be discussed below in context of executions of database queries by a database system in accordance with one or more exemplary embodiments.

In a database system, at the start of the execution of database query (or query execution) an estimate of required memory can be estimated or calculated in accordance with one embodiment. It should be noted that although memory estimation can vary based on the type of the database query involved, an upper estimation can be calculated, for example, through input row length and type of function (e.g., analytic, regex). For example, if a database query involves a regular expression: "regex_replace(input, source, destination)", then the whole input row could be parsed for replacing the source with destination. Since the whole input row is to be parsed, an estimation of memory can be determined based on size of input row. As another example, if a regular expression involves a wild character (e.g., ".", "*", "?") then either a DFA (Deterministic Finite Automata) or NFA (Non-Deterministic Finite Automata) can be used to determine an expanded pattern length upon which at least a relatively rough estimate of the amount of memory needed can be made.

After an estimation is made, based on the availability of system resources, memory can be determined to either be allocated on a stack memory or a heap memory.

Optimization Using Heap Memory

Generally, size of stack memory is much smaller and stack memory is much more costly in comparison to heap memory. As such, in high workload database environments, it is very critical to limit the usage of stack memory. On the other hand, there is an overhead association with using the heap memory via API calls. As such, the increasing number of API calls to the heap memory could adversely affects performance by increasingly the overhead incurred due to the API calls to the heap memory.

It will be appreciated that the overhead incurred due to the API calls to the heap memory can be reduced by minimizing the number of API calls to the heap memory in accordance with one aspect. In other words, memory needed on heap memory for execution of a database query can be allocated in a single "chunk," in accordance with one aspect. The single "chuck" of heap memory can be allocated, for example, as a tunable parameter, such that the value of the tunable parameter depends on the availability of one or more system resources, as will be appreciated by those skilled in the art.

To Further elaborate, a single example can be considered, namely: "regex_replace(input, source, destination). In the example, each of the input characters can be parsed and mapped with a source pattern. If the length of input row is, for example, 100 characters, then, for every iteration of the input character when mapped with the source pattern, the memory allocation calls for the comparisons could be as high as: "input_length*source_pattern."

If the input table has 100,000 (100 k) of rows, then total calls to the heap memory API could be as high as: "100,000 (100K) * input_length*source_pattern".

In database environments where thousands of database queries can run concurrently, such large number of calls to heap memory API can add a significant amount of overhead. Allocating relatively large or huge amounts of memory on the stack memory (or program stack) can result in an error, namely, a stack overflow.

To avoid stack overflow, after a memory estimation is made, for example, based on system resources and memory available in program stack, a decision can be made dynamically, at run time, to switch the memory allocation strategy from the stack memory to heap memory. In other words, a "dynamic memory switch" can be made. For this "dynamic memory switch" to occur, a threshold value can be determined, for example, based on system workload, resource availability, etc. For example, If the required memory is less than a determined threshold value, then memory allocation can be made in stack memory, but if the e required memory is more than or equal than a determined threshold value, then the then memory allocation can be made in heap memory.

As noted above, heap memory can be allocated at once, or by making a single API call for a single "chunk" of heap memory. However, it should be noted that the actual or physical size of "chunks" of heap memory allocated can also vary based on one or more memory requirements. If the required memory is available, then memory can be allocated in as a single continuous memory block, else multiple non-continuous memory blocks can be provided. For example, if a request is made for 8 MB of memory, and 8 MB chunks are not available, then two (2) blocks or 4 MB of memory can be allocated. As a result, even in environments where memory resources are scarce, memory can be dynamically managed in an effective manner.

Another advantage of dynamic memory management techniques is the ability to effectively reuse the memory, in accordance with another aspect. To further elaborate, consider, "regexp_replace( )", as a simple example of a function. For functions, like "regexp_replace( )", the processing of each input row can be independent of other rows, so when processing of one row is done, memory allocated for that row can be reused for another row, say, a second row. If the size of the second row is more than size of first row then, the memory of first row is completely used, but an extra chunk of memory can also be allocated. Also, after all input rows have been proceed, memory can be freed/deallocated all at once.

Combining memory strategies can results in reducing the number of API calls to the heap memory to a point that they can less than:

"input_row*number_rows*input_pattern to max (input_row_size*input_pattern)"

This can effectively reduce the number of API calls to heap memory by an exponential factor. To elaborate even further, experiments conducted for database queries involving regular expressions for few cases have shown improvement in execution time as high as 30% (i.e., execution time was reduced by as much as about 30%). It should also be noted that there were also cases that showed no significant improvement, but the cases were generally confined to situations where memory usage was dramatically less than cases that showed marked improvements in execution time.

Figure 2:
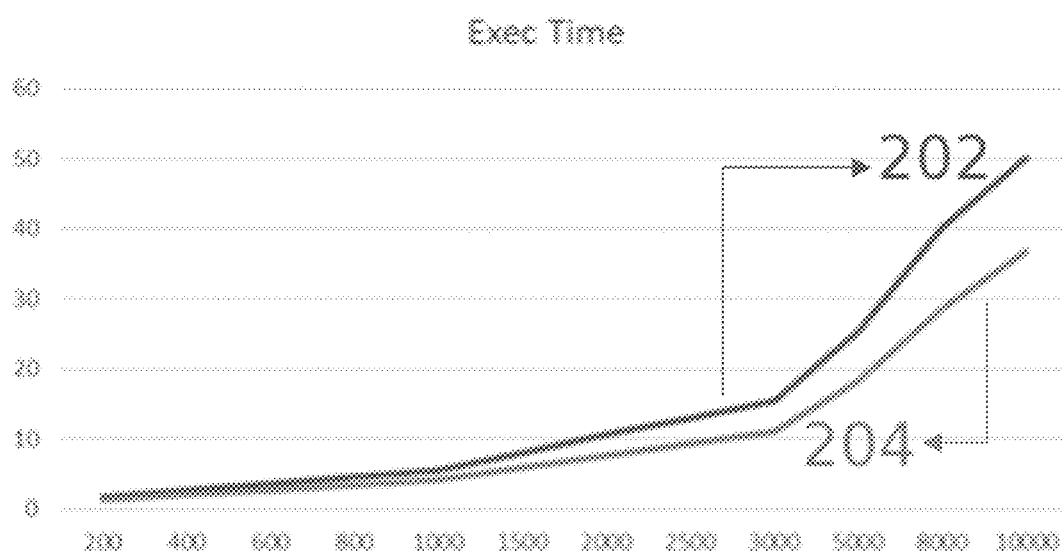
FIG. 2. depicts execution time improvement for retrieving one or more substrings using a regular expression in accordance with one embodiment.

FIG. 2 depicts execution time improvement for retrieving one or more substrings using a regular expression "substr( )" with there (3) back references:

"(([this])([is])([test])\1\2\3)"

Referring to FIG. 2, X-axis denotes the size of Input row length, and Y-axis denotes the Execution time. Curve 202 represents a conventional behavior of execution using Stack Memory. On the other hand, Curve 204 represents the execution using dynamic memory allocation with optimizing the heap memory usage in accordance with one embodiment, where a significant improvement in execution time is shown.

EXAMPLE 1

Pizza

To elaborate even further, consider an example of finding characters in a string that are repeated consecutively, wherein based on a pattern, either the whole word or the matched string is returned. In the example, a character "z" is repeated consecutively, and a pattern like—"([a-z])(\1)" will check for any lower case alphabet that is occurring again and return the same.

If a substring regex function is used as shown below, then "pida" is returned as output:

```
-    select regexp_substr(source, pattern) from table
    where,
    source is - pizza
    pattern is - ([a-z])(\1)
    then zz is returned as output.
    If a replace regex function is used like below,
-    select regexp_replace(source, pattern, destination) from table
    where,
    source is - pizza
    pattern is - ([a-z])(\1)
    destination is - d
```

EXAMPLE 2

Cheese Pizza a Common Type of Pizza

In this example, the word "pizza" is repeated two times and a pattern like—"(pizza).*(\1)" will check and return multiple occurrences of "pizza" along with the text in between If a substring regex function is used like below,

```
-    select regexp_substr(source, pattern) from table
    where,
        source is - cheese pizza a common type of pizza
        pattern is - (pizza).*(\1)
    then pizza a common type of pizza is returned as output.
    If a replace regex function is used like below,
        -    select regexp_replace(source, pattern, destination) from table
    where,
        source is - cheese pizza a common type of pizza
        pattern is - (pizza)*(\1)
        destination is - pizza is replaced
    then cheese pizza is replaced is returned as output.
```

Conventional Memory Allocation for Pattern Matching

Typically, the basis of a pattern matching algorithm that uses a regular expression is to loop through a whole sentence (in some cases recursively checking multiple times) and save any matched words or characters. These saved words will be used to match in the other parts of input string.

During the process of saving the characters or words, for simple patterns, or small input sentences, memory footprint consumption would be small and the impact on whole workload would be minimal. In such cases allocation of memory from a process stack (or memory stack) would not be very complex to implement.

Consider again the Example 1 noted above, where repeated characters are matched. In such cases memory allocation in stack could be as depicted in FIG. 3.

Figure 3:
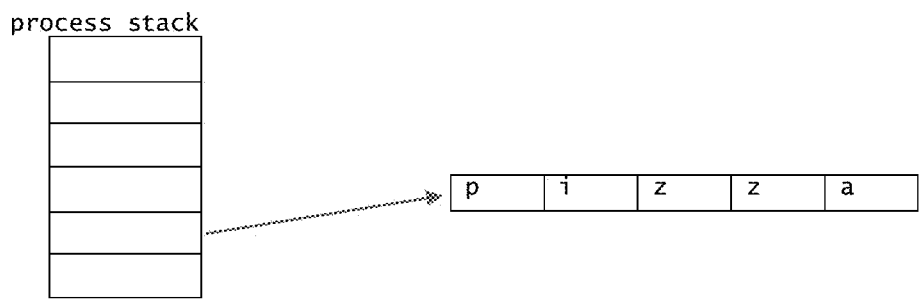
FIG. 3 depicts matching repeated characters in accordance with one embodiment.
Figure 3:
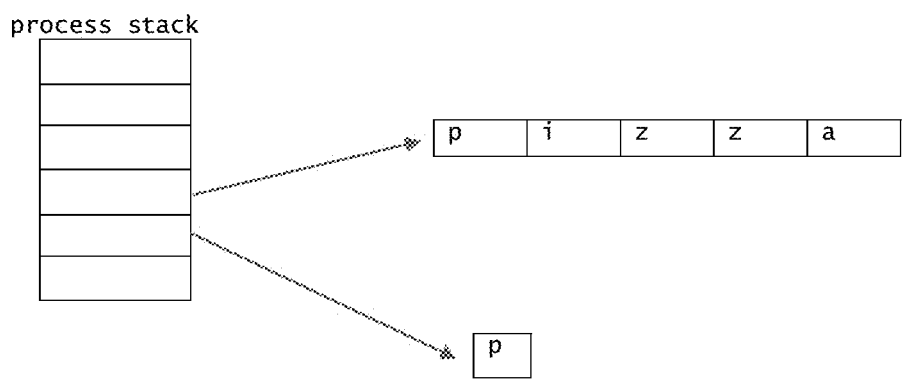

Referring to FIG. 3, when searching for repeated character, a basic pattern matching algorithm is to save each character and search if it is present elsewhere in the entire sentence, (i.e., save "p" and check if it is present, where this search ideally varies based on the type of the pattern match algorithm used).

So, in the example depicted in FIG. 3, apart from the initial word "pizza" the character "p" will be saved, consuming additional memory in process stack. After the character "p" is saved, the same process is repeated for other characters in the input string.

In cases demonstrated by the example depicted in FIG. 3, during the search process, in addition to saving the character/word, the metadata of the character/word can also be saved. When complex patterns or large inputs are involved, it is possible to have many cases where the memory footprint can be substantial and therefore adversely impact the workload. During such cases if memory is allocated in process stack (or stack memory), the memory of the process stack can overflow, possibly even resulting in hanging, or suspension of the system and/or its database operations. This would be highly undesirable.

Dynamic Memory Switch

To avoid unexpected results and highly undesirable conditions (e.g., stack overflows, suspension of the system and/or its database operations) that can arise, especially, in processing complex patterns with large input data, allocating memory in the heap memory rather the process stack (or stack memory) can be a much better approach. In doing so, memory allocation can be switched from the stack memory to heap memory, dynamically at run time, when needed, for example, based on an estimation of current available memory in the stack memory, or even simply based on the total size of the stack memory. Of course, other factors, including, for example, the number and complexity of database queries that are concurrently running or pending can be considered.

Figure 4:
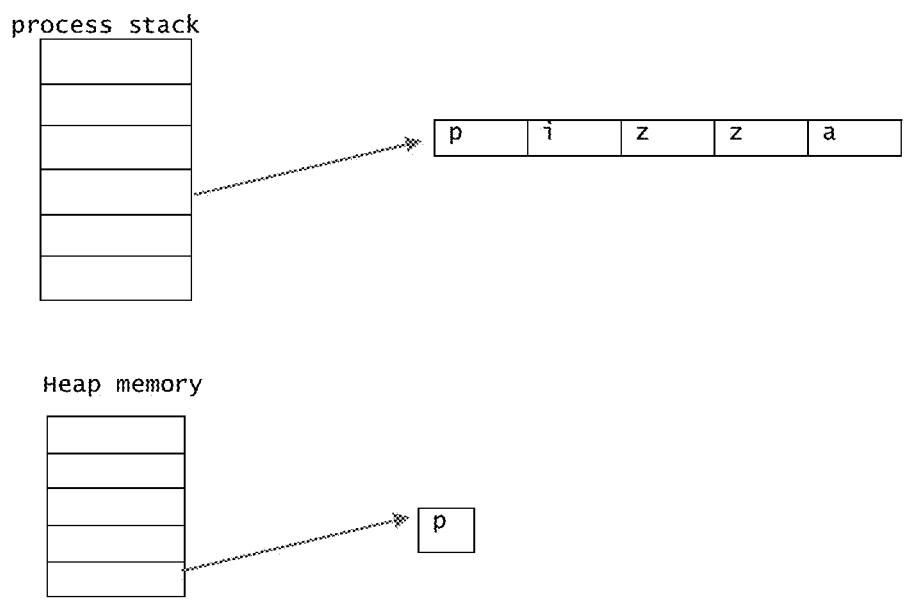
FIG. 4 depicts dynamic memory switching in accordance with one embodiment.

FIG. 4 depicts dynamic memory switching in accordance with one embodiment. One advantage of using this dynamic memory allocation depicted in FIG. 4 is that the management and reusability of memory can be achieved in existing database systems without having to incur a large amount of time and/or resources.

As an example, if 1 MB of memory is allocated for a first iteration of pattern match, after processing one iteration on an input string, the same memory can be reused for other iterations. If parallel processing is required based on number of parallel executions, memory can be easily allocated from heap in multiple chunks.

Also, by combining the reusability of allocated heap memory, the number of memory allocations that can used during pattern matching of a regular expression can drastically reduce from:

"length(input_row)*length(input_pattern)*number_rows" to "max(length(input_row)*length(input_pattern))"

This means that in example 1, if the number rows in input table are 10 k with size of each row being 5 bytes (pizza) and the size of pattern 2 (varies based on pattern compilation algorithm) then total number of memory calls (allocation & deallocation) are as follows:

Without reusing memory–(5*2)*10 k →both allocated & deallocated

With reusing memory–5 *2→1 time allocation & deallocation

Although allocating in the heap memory may add a little overhead compared to process stack, for larger inputs or for cases where relatively larger amounts of memory are required (e.g., recursive patterns) this overhead can be negligible.

For database queries involving large input data, dynamically switching of memory allocation for database queries involving regular expressions can avoid many instances of memory overflows issues that would have occurred using conventional memory allocation techniques.

Optimization in OpCodes in VMs

To further elaborate, run time memory management techniques of reusing memory at runtime will be further discussed below in greater detail in context of executions Opcodes provided by a Virtual Machine in a database system in accordance with one or more embodiments.

Today, most of the complex computing systems, especially DBMS have built-in Virtual Machines (VM's) that provide a layer of abstraction to satisfy different execution requirements. In doing so, usually, one or more layers or components above the Virtual Machine (VM) will generate a sequence of Opcodes that are understood and executed by the virtual machine. Typically, the Opcodes are part of an external interface definition of the VM. Typically, while executing the opcodes, VM will need memory to store and manipulate the intermediate results while the executing Opcodes in the sequence. The memory could be allocated on the heap memory or the stack memory of the VM process(es). When the memory is from the heap memory, the VM would incur some performance overheads due to allocation and deallocation while executing the codes. On the other hand, if the memory is allocated from the stack memory, then the VM would run the risk of running out of memory, as conventionally, there is no mechanism to deallocate memory until the execution of the complete sequence of opcodes is finished by VM.

It will be appreciated that performance and memory requirements can be satisfied while satisfying memory requirements for Opcode execution, in accordance with one aspect. This would enable efficient utilization of memory locally within the confines of Virtual Machines while executing opcodes, by providing mechanisms to effectively re-use the memory allocated, resulting in reduction of the overall external memory requests made by the Virtual Machine.

As Virtual Machines execute opcodes, they need memory to store the intermediate results and pass them as input parameters for subsequent opcodes. In other words, the Opcode-based VM requests through external API calls for memory requirements, such as, storing the intermediate results. However, conventionally, once the intermediate results are consumed by subsequent opcodes, the memory allocated for the intermediate results might not be deallocated after they are consumed by the consequent Opcodes. This may lead to a VM running out of memory, especially, in case of memory availability constraints enforced due to lack of enough physical resources, or when the VM must execute a very complex sequence of Opcodes which require a relatively large amount of memory for storing intermediate results.

Figure 5A:
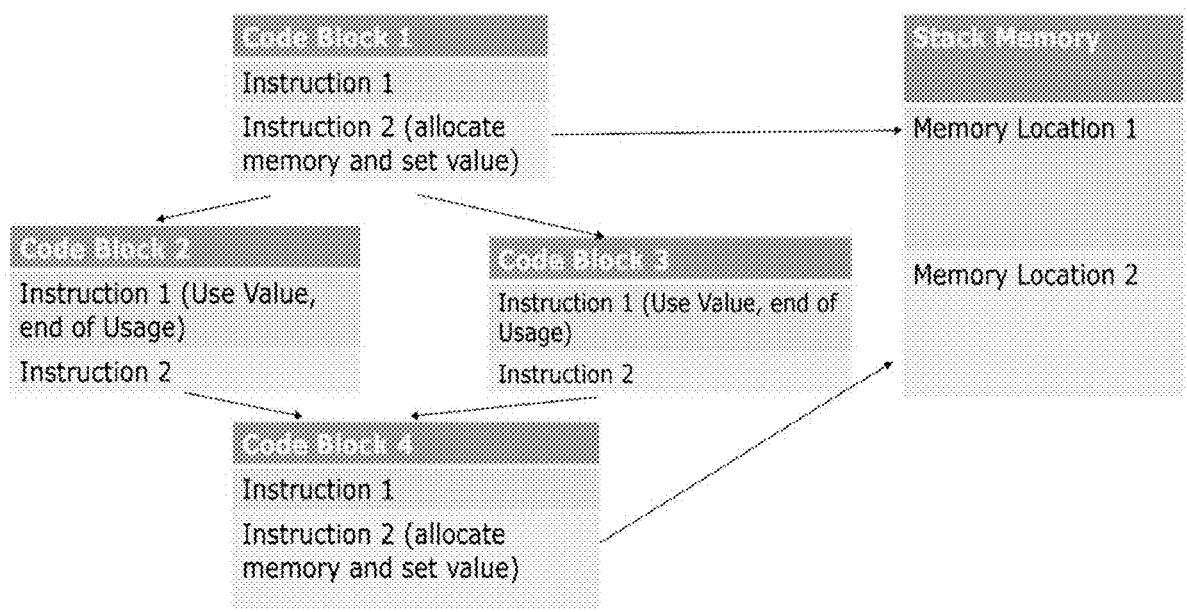
FIG. 5A depicts a conventional usage of stack memory in connection with execution of Opcodes.

FIG. 5A depicts a conventional usage of stack memory in connection with execution of Opcodes. Referring to FIG. 5A, an Instruction 2 in code block 4 re-allocates memory even though the Memory Location 1 could be reused in code block 4 since its validity of usage ceases after the execution of instruction 1 of code block 2, or code block 3. This problem can be even worse if the sequence of instructions in code blocks 1,2,3 and 4 are executed in a loop for multiple times.

However, it will be appreciated that memory can be reused across Opcodes, for example, through "live-range" analysis of memory allocations, in accordance with one embodiment. With a stack-based architecture for VMs, live range analysis can, for example, be facilitated by tracking Opcodes' memories that are popped from a stack memory, which then can become eligible for memory reuse. In one embodiment, a light-weight functionality can facilitate reuse of memory that was allocated instead of deallocating the memory which is not in use anymore. To realize this functionality, the VM can, for example, keep track of all the memory allocations that are done through external APIs and collect them into a hash table based on requested size as the hashing field or simply a linear linked list, when they are supposed to be deallocated. For subsequent memory requests, this hash table or a linear list can be searched first to check if the existing free memory chunks can satisfy the request locally before making an external API call to get the requested memory.

Example Approach (Case) 1: Live-range analysis for stack-based virtual machine can be simple as it can be facilitated by stack pop operation which takes the memory out of use. This out of use memory can be considered for reuse.

Example Approach (Case) 2: This can be further extended with live-range analysis like existing register allocation mechanisms to be applied for memory reuse in a register-based virtual machines.

To further elaborate, consider a simple SQL SELECT" statement, as a simple example, where a simple string in "UNICODE" must be compared to a set of LATIN strings and output the rows that match the condition:

The VM can easily keep track of the scope of this memory allocations and when it may be out of scope. The free memory chunks can, for example, be added into a list or table holding the information about free memory chunks that are available for subsequent memory requests. For the next iteration, when the VM needs to make the allocations again, it will be able to search and find free memory locally avoiding the external calls for memory request.

By way of example, a search algorithm can be implemented in at least two (2) ways to satisfy a new memory request, namely, either a best-fit strategy where the memory chunk returned is an optimal one to satisfy the request, or a first-fit strategy where the first available memory chunk that is greater than or equal to requested size is returned. Both strategies have pros and cons. As such, depending on the memory request patterns by the Virtual Machine, one strategy may be better over the other. As another example, another more restricted best-fit strategy could be to match

```
    SELECT UNICODE_STR FROM UNICODE_STR_TBL
WHERE UNICODE_STR IN ('NEW YORK', 'SYDNEY', 'HYDERABAD',
'MUMBAI', 'NEW DELHI');
Assume the following sequence of opcodes to be executed by a virtual machine are
generated to evaluate the condition for each row of the UNICODE_STR_TBL.
    START;
    LOAD UNICODE_STR->REG1;              <<<< Memory allocated by VM
    for REG1
    SET I=0;
    SET COUNT=5;                          <<<< No. of items in the list
L1:
    LOAD LATIN_STR[I]->REG2;             <<<<< Memory allocated by
    VM for REG2
    CONVERT_TO_UNICODE REG2->REG3;        <<<< Memory allocated by
    VM for REG3
    CHECKEQ REG1, REG3;
    JUMP_IF_EQ L2;
    INCR I;
    COMPARE I, COUNT;
    JUMP_IF_LESS L1;
L2:
    SET RESULT_COND=TRUE;
    END;
```

Considering the above sequence of Opcodes generated to evaluate the condition, the loop L1 may get executed 5 times in worst case when the condition is not satisfied. In the example, the VM needs to allocate memory for REG2 and REG3 and deallocate them appropriately. If the memory comes from a stack-based or heap-based allocation, it might not be deallocated until the END. However, in accordance with one aspect, memory allocations and deallocations can go through an additional layer of abstraction, which would enable searching for any existing free memory "chunks" that were allocated earlier and are not in use currently.

In the above example, on the first entry into the loop the list or table holding the free memory chunks will be empty. External API calls are made by the VM to request memory.

the exact size of the request with the available sizes of the free memory chunks. This will benefit in cases where the memory allocations happen repeatedly for a fixed set of memory sizes. In this approach there may not be any fragmentation issues.

Example of Stack Memory Reuse While Executing a Sequence of Opcodes by a Virtual Machine Consider the following query: select string from table where string in ("apple", "nokia","pixel","google");

Conventionally, a DBMS system would generate a sequence of opcodes to evaluate the where condition as follows for each input row from the table:

```
start:
    store string (from table row) into Mem1;    ← Mem1 is memory
    allocated on stack
    store "apple" into Mem2;                    ← Mem2 is also allocated on
    stack
    compare Mem1 with Mem2;                     ← if string = "apple"
    if true jump to qualified;
    store "nokia" into Mem3;                    ← Mem3 is also allocated
    on stack
    compare Mem1 with Mem3;                     ←if string = "nokia"
    if true jump to qualified;
    store "pixel" into Mem4;                    ← Mem4 is also allocated
```

```
on stack
    compare Mem1 with Mem4;        ← if string = "pixel"
    if true jump to qualified;
    store "google" into Mem5;      ← Mem5 is also allocated
on stack
    compare Mem1 with Mem5;        ← if string = "google"
    if true jump to qualified;
    jump to end;
qualified:
    << this row qualified to be output to user>>
end:
    exit;
```

In the above example, every time there is a requirement for memory to store the "new" constant string for comparison, there is new memory getting allocated on the stack memory because that Virtual Machine executing this sequence of Opcodes is not aware of the already allocated memory. All the stack memory would be automatically deallocated after the "exit;" is executed.

An additional light weight memory management layer can be provided within the context of a Virtual Machine, in accordance with one aspect. The memory that is allocated but will not be used further (e.g., live-range analysis can be performed) will be managed locally by reusing it until the completion of the execution of all the opcodes till the exit statement:

```
start:
    store string (from table row) into Mem1;   ← Mem1 is memory
allocated on stack
    store "apple" into Mem2;                    ← Mem2 is also allocated on
stack
    compare Mem1 with Mem2;                     ← if string = "apple"
    if true jump to qualified;
    store "nokia" into Mem2;                    ← Mem2 is reused as the
contents("apple") of Mem2 are not useful further Mem2 would be added to an
internal list that would be searched before requesting memory from lower layers
like PDE or OS etc.
    compare Mem1 with Mem2;                     ← if string = "nokia"
    if true jump to qualified;
    store "pixel" into Mem2;                    ← Mem2 is reused again size
matches
    compare Mem1 with Mem2;                     ← if string = "pixel"
    if true jump to qualified;
    store "google" into Mem3;                   ← Mem3 is allocated as suitable
size if not found
    compare Mem1 with Mem3;                     ← if string = "google"
    if true jump to qualified;
    jump to end;
qualified:
    << this row qualified to be output to user>>
end:
    exit;
```

As a result, the total amount of stack memory allocated during the execution of Opcodes can be reduced significantly. For a complex query, the Opcodes generated would be in thousands of lines and the number of memory allocation calls on the stack would be proportional. Usually, memory is allocated repeatedly for the same size. As such, the run time memory management techniques could greatly reduce the amount of memory needed for execution of Opcodes.

As an example of an implantation, Teradata has an evaluator subsystem (EVL) that evaluates expressions. EVL is a stack-based virtual execution engine that executes opcodes generated by upper layer like parser, to evaluate the expressions. A lightweight mechanism can be provided to effectively reuse memory in accordance with one embodiment. All the intermediate operands can be pushed on to the EVL stack and the memory can be reclaimed to a free list when the operand is popped from the stack. It has been observed that the memory consumption requirements in best cases have been brought down by up to 99%. In most of the observed cases, the memory consumption with reuse facility implemented in an EVL subsystem can drop the memory consumption to a fraction of memory that would have been used.

Figure 5B:
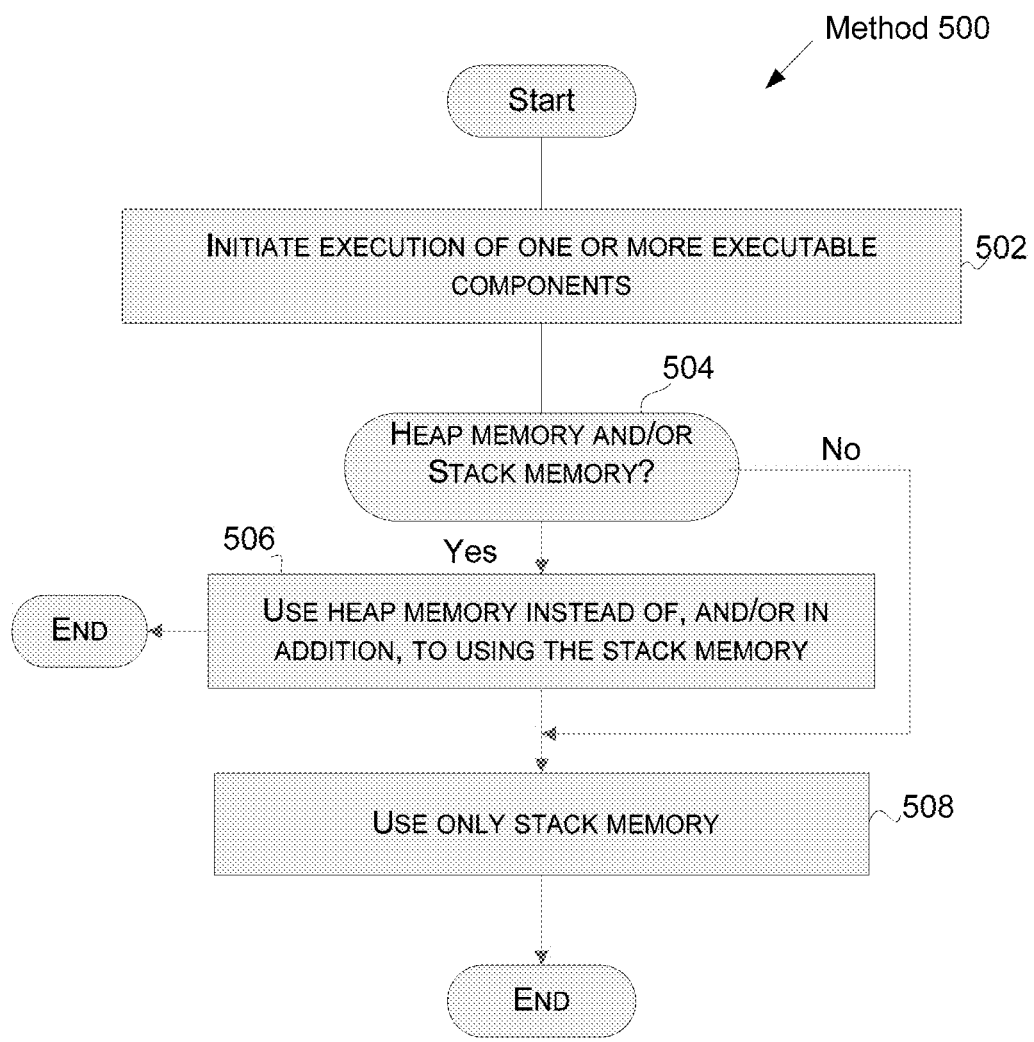
FIG. 5B depicts a computer-implemented meth for executing one or more executable components in a computing system in accordance with one embodiment.

To elaborate even further FIG. 5B depicts a computer-implemented method 500 for executing one or more executable components in a computing system in accordance with one embodiment. The computer-implemented method 500 can, for example, include one or more processors configured to store and use data stored in at least one stack memory and at least one heap memory for execution of the one or more executable components. The computer-implemented method 500 can, for example, be implemented by the Runtime Memory Management System (RMMS) 102 (shown in FIG. 1).

Referring to FIG. 5, initially, the execution of one or more executable components are initiated (502) at run time when the executable components are to be executed by the computing system. At run time, it is also determined (504) whether to designate for use the heap memory to execute the one or more executable components instead of, and/or in addition to the stack memory to execute and/or to continue the execution of the one or more executable components by the computing system. Accordingly, at least a portion of the heap memory can be designate (506), at run time, to execute the one or more executable components when it is determined (504) to designate the heap memory for execution of the one or more executable components instead of, and/or in addition, of the stack memory in order to execute, and/or to continue, the execution of the one or more executable components. On the other hand, only the stack memory is designated (508) at run time, for use for the execution of the one or more executable components when it is determined (504) not to designate the heap memory instead of, and/or in addition to using the stack memory to execute the one or more executable components.

Figure 6:
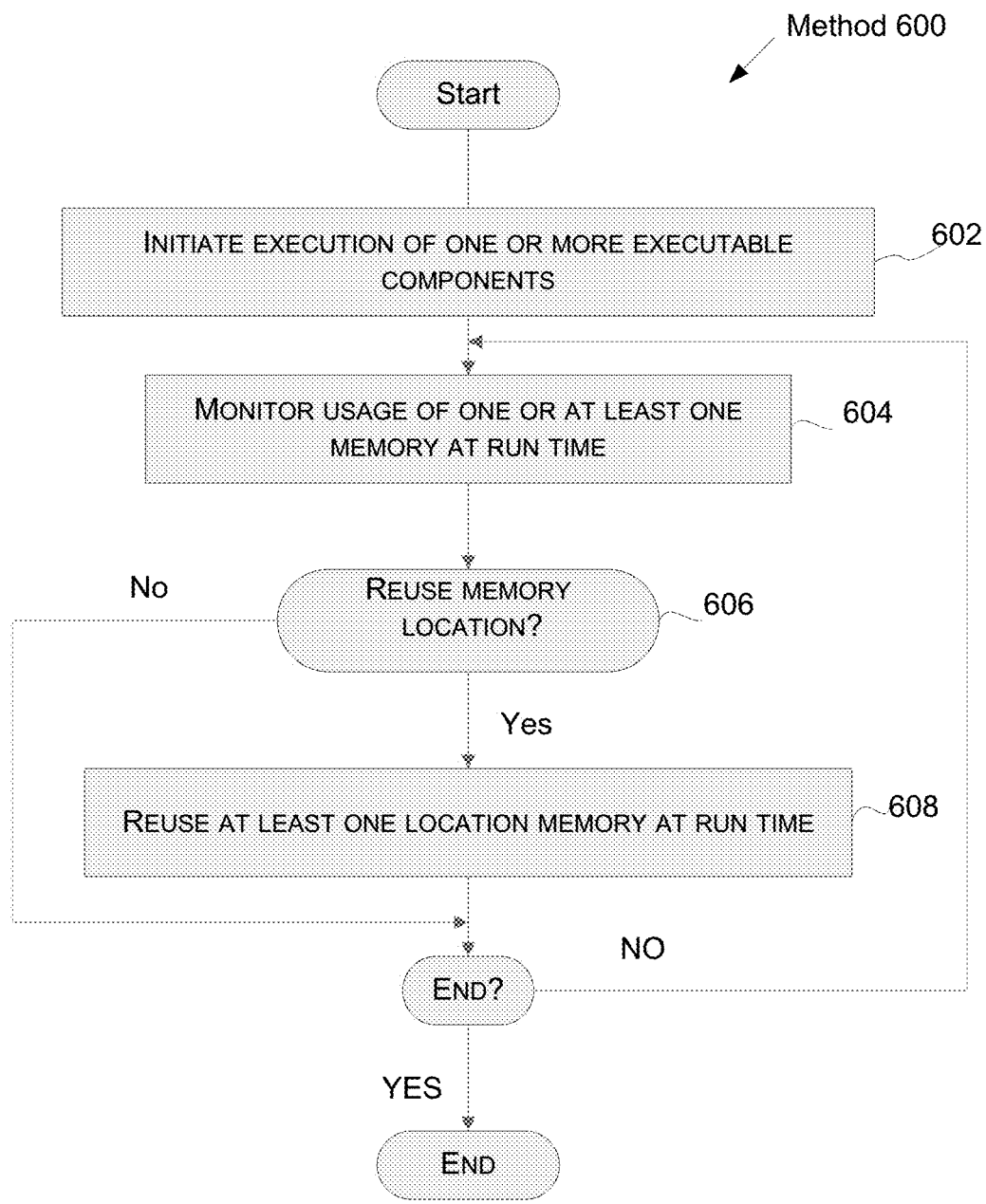
FIG. 6 depicts a computer-implemented method for executing one or more executable components in a computing system in accordance with another embodiment.

To elaborate still further, FIG. 6 depicts a computer-implemented method 600 for executing one or more executable components in a computing system in accordance with another embodiment. The computer-implemented method 600 can, for example include one or more processors configured to used data stored in at least one memory (e.g., stack memory, heap memory) for execution of the one or more executable components. The computer-implemented method 500 can, for example, be implemented by the Runtime Memory Management System (RMMS) 102 (shown in FIG. 1).

Referring to FIG. 6, initially, execution of one or more executable components are initiated (602) in the computing system by using the at least one memory, at run time, when the executable components are being executed by the computing system. Next, usage of the at least one memory by the one or more executable components is monitored (604) at run time when the memory is being used actively by the execution of the one or more executable components. Thereafter, based on the monitoring (604), at run time, when the one or more executable components are executed by the computing system, it is determined (606) whether to reuse at least one location of the memory that is being actively used for the execution of the one or more executable components. Accordingly, at least one memory location of the at least one memory can be reused (608) when it is determined (606) to reuse at least one location of the at least one memory while it is being actively used, at run time, for the execution of the one or more executable components. It should be noted that the at least one memory can, for example, be a stack memory (or process stack) or a heap memory. For example, the one or more executable components can include one or more Opcodes of a Virtual Machine operating in a database management system, where a stack memory is used for the execution of the one or more Opcodes.

The various aspects, features, embodiments or implementations described above can be used alone or in various combinations. For example, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display)

monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of executing one or more executable components in a computing system that includes one or more processors configured to used data stored in at least one stack memory and at least one heap memory for execution of the one or more executable components, wherein the computer-implemented method comprises:
    initiating, by the computing system, the execution of one or more executable components when the executable components are to be executed by the computing system;
    determining, at run time, when the one or more executable components are to be executed or are being executed by the computing system, whether to designate the heap memory for execution of the one or more executable components instead of the stack memory; and
    designating at least a portion of the heap memory, at the run time, for the execution of the one or more executable components when the determining determines to designate the heap memory to execute the one or more executable components instead of the stack memory; and
    designating only the stack memory, at the run time, to execute the one or more executable components when the determining determines not to designate the heap memory, for execution of the one or more executable components;
    determining, at the run time, when the one or more executable components are to be executed or are being executed by the computing system, whether to designate the heap memory for execution of the one or more executable components in addition to, the stack memory, in order to execute and/or, to continue the execution of the one or more executable components by the computing system; and
    designating at least a portion of the heap memory, at the run time, for the execution of the one or more executable components when the determining determines to designate the heap memory in addition to the stack memory to execute, and/or to continue the execution, of the one or more executable components.

2. The computer-implemented method of claim 1, wherein the computer-implemented further comprises: dynamically switching from designating for use and/or using the stack memory to the heap memory of the computing system, at run time, to execute the one or more executable components.

3. The computer-implemented method of claim 1, wherein the computer-implemented further comprises: dynamically switching, at run time, between the stack memory and the heap memory, at run time, to execute the one or more executable components.

4. The computer-implemented method of claim 1, wherein the computer-implemented further comprises: determining, at run time, an estimated total size of memory needed to execute the one or more executable components; and allocating the total estimated size of memory needed to execute the one or more executable components on the heap memory.

5. The computer-implemented method of claim 4, wherein the allocating of the total estimated size of memory needed to execute the one or more executable components on the heap memory is performed by an API call that allocates the total estimated size of memory needed, thereby allocating the total estimated size using only one API call.

6. The computer-implemented method of claim 4, wherein the determining of whether to designate the heap memory to execute the one or more executable components instead of, and/or in addition to using the stack memory comprises: determining, at run time, one or more the following: the total size of memory needed to execute the one or more executable components, an actual and/or estimated size of memory available in stack memory and/or heap memory, the number of processes currently running, a number of processes currently running that require a significant amount of memory, an actual size of the stack memory and/or heap memory.

7. The computer-implemented method of claim 1, wherein the computer-implemented further comprises: Determining, at run time, a total amount of memory need for the execution of the one or more components; determining, at run time, at least partly based on the determined amount of memory need for the execution of the one or more components to use the heap memory for the execution of the one or more components; and allocating, at runtime, the determined amount of memory needed for the execution of the one or more components on the heap.

8. The computer-implemented method of claim 1, wherein allocating the determined amount of memory needed for the execution of the one or more components on the heap allocates the determined amount of memory by making a single API call to allocate the entire determined amount of memory.

9. The computer-implemented method of claim 1, wherein the computer-implemented further comprises: monitoring, at run time, usage of the stack memory for the execution one or more executable components when the stack memory is used for the execution of the one or more executable components; determining, based on the monitoring, at run time, when the one or more executable components are executed by the computing system, whether to reuse at least one memory location of the stack that that has been used for the execution of the one or more executable components; and reusing, at run time, the at least one memory location of the stack memory when the determining determines to reuse at least one location of the stack memory.

10. The computer-implemented method of claim 9, wherein the one or more executable components include one or more Opcodes of a Virtual Machine operating in the computing system.

11. A computing system that includes one or more processors configured to use at least one stack memory and at least one heap memory to store data for execution of the one or more executable components, wherein the one or more processors are further configured to:
   initiate the execution of one or more executable components at run time when the executable components are to be executed by the computing system;
   determine, at run time, when the one or more executable components are being executed by the computing system, whether to designate a first memory or a second memory to execute the one or more executable components, wherein the first memory and second memory are different types of memory; and
   designate the first memory, at the run time, for the execution of the one or more executable components when the determining to designate the first memory for the execution of the one or more executable components; and
   designate the second memory, at the run time, to execute the one or more executable components when the determining to designate the second memory for the execution of the one or more executable components.

12. The computing system of claim 11, wherein the one or more processors are further configured to:
   determine, at run time, when the one or more executable components are being executed by the computing system whether to designate the first memory and second memory for the execution of the one or more executable components; and
   designate, at run time, the first memory and second memory for the execution of the one or more executable components when the determining determines to designate the first memory and second memory for the execution of the one or more executable components.

13. The computing system of claim 11, where in the first memory is configured as a stack memory and the second memory is configured a heap memory.

14. The computing system of claim 13, wherein the one or more processors are further configured to: switch, at run time, the designation of the first memory to the second memory for the execution of the one or more executable components.

15. A computer-implemented method of executing one or more executable components in a computing system that includes one or more processors configured to store and to use data stored in at least one memory to execute one or more executable components, wherein the computer-implemented method comprises:
   initiating, by the computing system, the execution of one or more executable components in the computing system by using the at least one memory, at run time when the executable components are being executed by the computing system;
   monitoring, at run time, usage of the at least one memory for the execution one or more executable components when the memory is being used by the execution of the one or more executable components; and
   determining, based on the monitoring, at run time, when the one or more executable components are executed by the computing system, whether to reuse at least one location of the at least one memory that has been used for the execution of the one or more executable components; and
   reusing the at least one memory location of the at least one memory when the determining determines to reuse at least one location of the at least one memory that has been used for the execution of the one or more executable components.

16. A computer-implemented method of claim 15, wherein the at least one memory is one or more of the following: a stack memory, and a heap memory.

17. A computer-implemented method of claim 15, wherein the at least one memory is a stack memory, and wherein the one or more executable components include one or more Opcodes of a Virtual Machine operating in a database management system.

18. A computer-implemented method of claim 15, wherein the determining of whether to reuse the portion of the memory that has been used for the execution of the one or more executable components further comprises, using a list for the stack memory to identify memory locations of the stack memory that can be reused.

19. A non-transitory computer readable medium storing at least executable computer code for executing one or more executable components in a computing system, wherein the executable computer code includes:
   executable computer code configured to determine, at run time, when the one or more executable components are to be executed or are being executed by the computing system whether to designate a first memory and a second memory together for the execution of the one or more executable components, wherein the first memory is predetermined prior to run time as a default for execution of the one or more executable components by the computing system; and
   designate, at run time, the second memory for the execution of the one or more executable components in addition to the first memory when the determining determines to designate the second memory for the execution of the one or more executable components in addition or instead of the first memory.

20. The non-transitory computer readable medium of claim 19, where in the first memory is configured as a stack memory and the second memory is configured as a heap memory.

21. A computing system that includes one or more processors configured to store and to use data stored in at least one memory to execute one or more executable components, wherein the computing system is further configured to:
   initiate the execution of one or more executable components in the computing system by using the at least one memory, at run time when the executable components are being executed by the computing system;
   monitor, at run time, usage of the at least one memory for the execution one or more executable components when the memory is being used by the execution of the one or more executable components; and
   determine, based on the monitoring, whether to reuse at least one location of the at least one memory that has been used for the execution of the one or more executable components; and
   reuse the at least one memory location of the at least one memory when the determining determines to reuse at least one location of the at least one memory that has been used for the execution of the one or more executable components.

22. Non-transitory computer readable medium storing at least executable computer code for executing one or more executable components in a computing system, wherein the executable computer code when executed:
   initiates execution of the one or more executable components in the computing system by using the at least one memory, at run time when the executable components are being executed by the computing system;
   monitors, at run time, usage of the at least one memory for the execution one or more executable components when the memory is being used by the execution of the one or more executable components; and
   determines, based on the monitoring, whether to reuse at least one location of the at least one memory that has been used for the execution of the one or more executable components; and
   reuses the at least one memory location of the at least one memory when the determining determines to reuse at least one location of the at least one memory that has been used for the execution of the one or more executable components.

* * * * *